Nov. 15, 1960 W. E. ACKERMAN 2,959,869
DRYING MIXTURES OF COARSE AND FINE PARTICLES
Filed Aug. 27, 1959 2 Sheets-Sheet 1
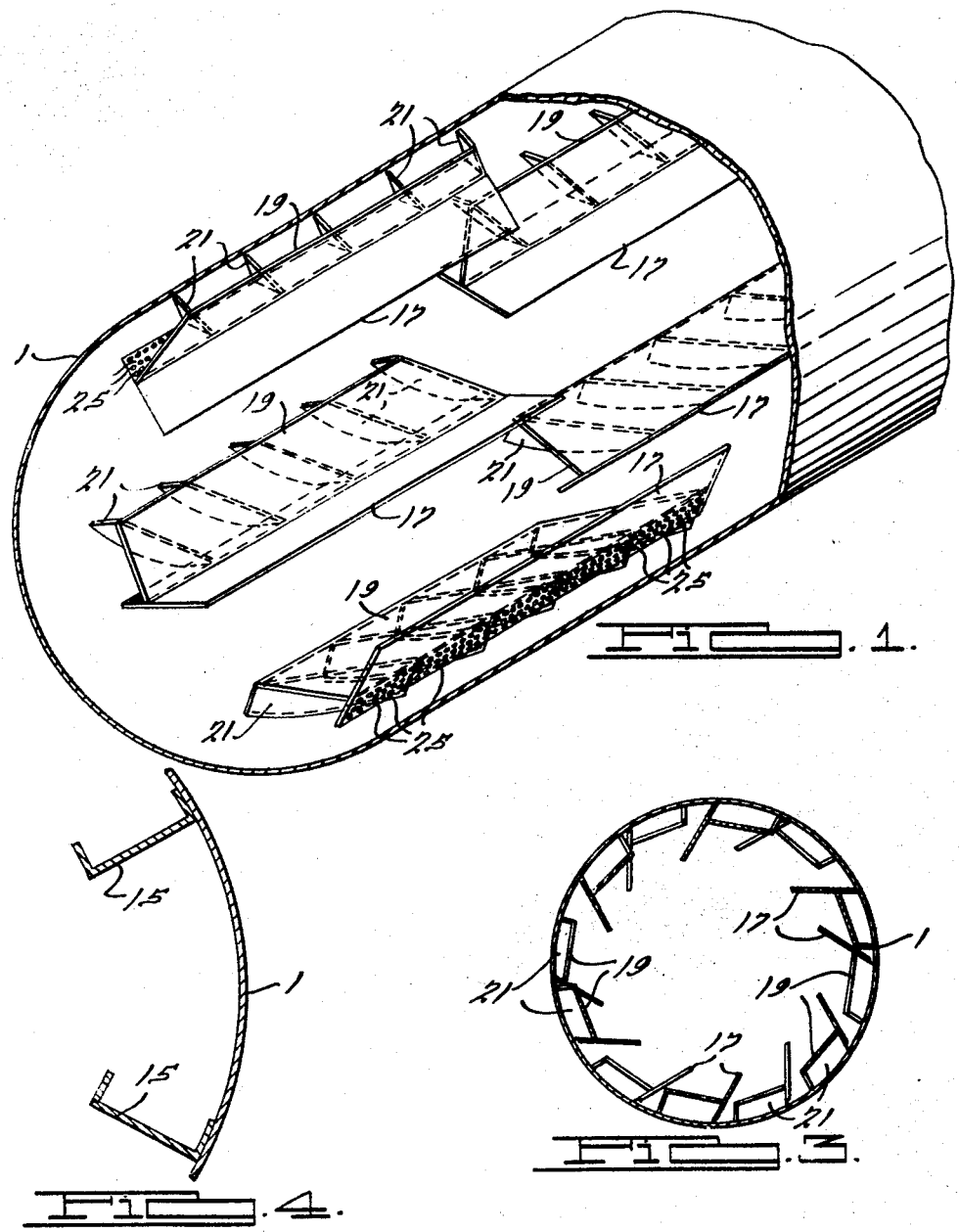
INVENTOR.
Wilbert E. Ackerman.
BY
Robert E. Dunn
ATTORNEY.

Nov. 15, 1960 W. E. ACKERMAN 2,959,869
DRYING MIXTURES OF COARSE AND FINE PARTICLES
Filed Aug. 27, 1959 2 Sheets-Sheet 2
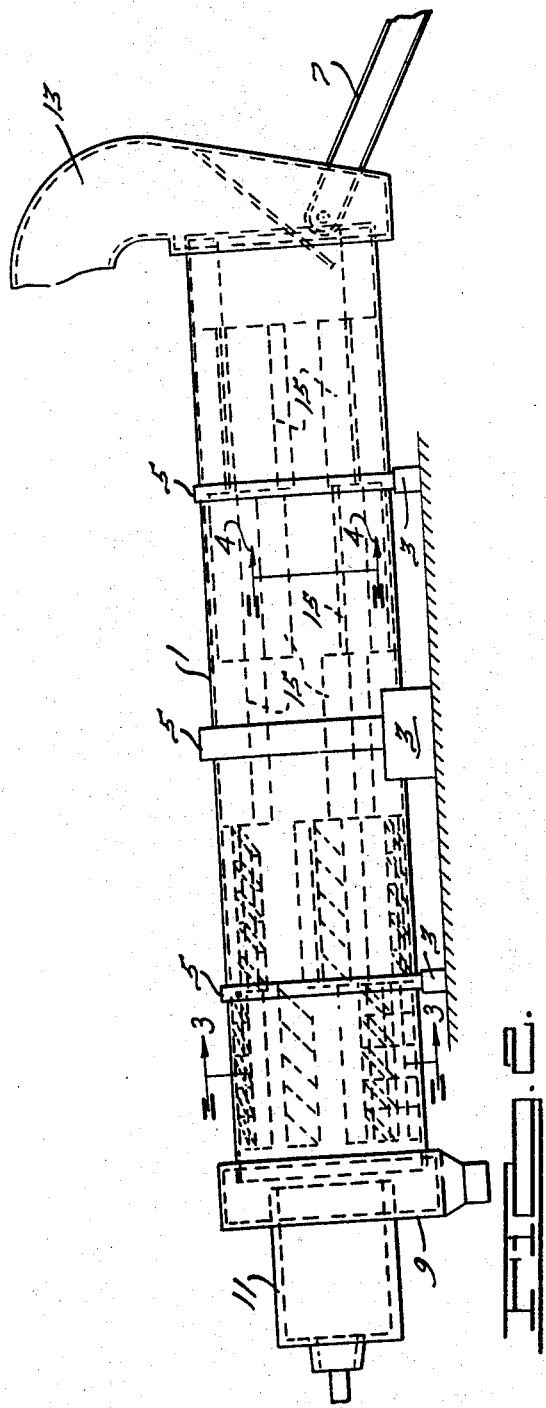
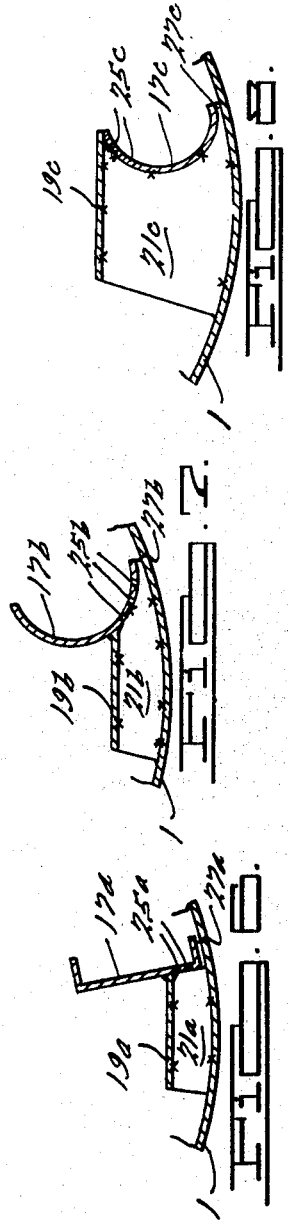
INVENTOR.
*Wilbert E. Ackerman.*
BY
*Robert E. Dunn*
ATTORNEY.

United States Patent Office 2,959,869
Patented Nov. 15, 1960

2,959,869

DRYING MIXTURES OF COARSE AND FINE PARTICLES

Wilbert E. Ackerman, 44645 Governor Bradford Road, Plymouth, Mich.

Filed Aug. 27, 1959, Ser. No. 836,526

16 Claims. (Cl. 34—135)

This invention relates to the art of drying mixtures of coarse and fine particles. In a more specific aspect, this invention relates to the construction of and operation of lifting flights for showering such mixtures across the space within a drum rotating about an approximately horizontal axis in order to drive out entrained and contained liquid in the particles forming the mixture.

The foregoing statement of the art to which this invention pertains is intended to indicate that this invention is broadly useful in many specific areas other than the field in which the particular problem exists which gave rise to this invention. This will become apparent as this disclosure proceeds. The particular problem which has been overcome by this invention is one of long standing and of increasing importance. The problem is the method and means for effectively drying mineral aggregate to be used in bituminous road paving compositions.

Those skilled in the art of the construction of asphalt roads in those areas of the world where the relative humidity is usually significantly high are well aware that the oldest and most perplexing problem is the drying of the mineral aggregate preparatory to mixing it with heated oil or asphaltic material. The prior patents in this field, themselves, are proof of the age and continuing nature of this problem. The problem is noted and method and means for attacking the problem are disclosed in U.S. 545,120 (1895), U.S. 1,808,626 (1931), U.S. 2,041,155 (1936), U.S. 2,275,600 (1942), U.S. 2,728,146 (1955) and U.S. 2,825,149 (1958). Currently, the problem is under active investigation by representatives of educational institutions, state governments, asphalt plant manufacturers and asphalt road construction companies. Exemplary of such effort is a recent joint meeting of such representatives under the auspices of the Michigan Asphalt Paving Association, Inc., on the subject of drying and moisture control of aggregate.

Mineral aggregate comprises natural gravel, crushed gravel, crushed limestone, and the like, any of which contains or is blended with sand. Such mixtures contain variously sized particles which can be arbitrarily divided into two classes, sand and stone. It will be readily understood that reference to sand means the finer particles and reference to stone means coarser particles. Aggregate may contain up to 10 weight percent of water, or more, and the art has come to recognize that there are two aspects to the problem of drying the aggregate. One is the entrained surface water in the mixture of sand and stone and the other is the internally-contained water, especially in the stone in the mixture. The stone is usually considered as the particles in the range of 3/8" to 5/8" size and such stone is relatively porus. Water is contained in the capillary crevices and it is the removal of the internal water in the stone that is believed to be the major problem.

The conventional dryer for mineral aggregate is an inclined, cylindrical or tubular vessel into one end of which the aggregate is fed, usually in countercurrent flow to hot combustion gases which are introduced into the opposite end. The dryer has lifting flights mounted along and about its inner surface in order to lift and shower the aggregate through the hot gases as the dryer is rotated.

One of the most easily noticed manifestations of incomplete drying of the aggregate is the difference in the temperatures of the sand and stone as the aggregate is discharged from the dryer. In the case of all single-shell, rotary aggregate dryers of which I am aware, the sand, i.e., the finer particles, in the discharge aggregate is hotter than the stone, i.e., the coarser particles. The temperature differential is usually about 50–75° F. and the temperature of the sand has been known to be as much as 125° F. higher than the stone temperature. Data showing the higher sand temperature and a discussion of the problem with which this invention is concerned are found in the report entitled, "Michigan State Highway Experimental Bituminous Concrete Construction Project," W. K. Parr et al., Proceedings of the Association of Asphalt Paving Technologists, Technical Sessions, volume 24, February 7, 8 and 9, 1955, pages 125–177.

The lower temperature of the stone is itself indicative of incomplete drying. When heated aggregate of this kind, wherein the sand is hotter than the stone, is further handled in the conventional system for preparing an asphalt paving mix, the aggregate is passed through vibrating screens to classify the particles of the aggregate into sizes and, then, the correct amount of sized aggregate is mixed with asphalt in a pugmill. At this point the hotter sand is again mixed with the relatively cooler stone and the asphalt and further manifestations of the incomplete drying of the stone can be noticed. Foaming occurs due to water vapor being driven from the stone when it contacts the hot sand. The water coming out of the stone increases the liquid content of the total paving mix which contributes to segregation between fine and coarse particles when the mix is laid on the raod. Most importantly, the adhesion of the asphalt to the aggregate particles is adversely affected by the water driven out of the stone by the hot sand. Flushing of free asphlat to the surface occurs which results in a slippery pavement surface. A lack of stability in the mat occurs which causes shoving ahead of the roller in the paving machine. A further consequence is premature scaling of the pavement surface under use conditions.

Prior attempts to solve this problem in single-shell rotary aggregate dryers in a practical and economical way have been uniformly unsuccessful because the results obtained included heating the sand to undesirably high temperatures. Thus, serious deleterious effects on the asphalt occur when aggregate heated to above about 375° F. is mixed into the asphalt. If the aggregate is allowed to cool in air after being heated above the normal drying temperature, the aggregate reabsorbs water from the air on cooling and the problem of effectively drying aggregate is still unsolved.

Thus, the aggregate dryer is the controlling unit in any plant for preparing bituminous road paving compositions. When aggregate containing high amounts of water is encountered, the feed rate of aggregate to the dryer must be decreased so that the water can be removed. This also involves higher fuel costs and high fuel costs and decreased production rate are the usual consequences when the dryers available today are employed to dry aggregate that contains significantly high amounts of water.

An object of this invention, therefore, is to provide a single-shell, rotary dryer for drying mixtures of coarse and fine solid particles.

A further object is to provide an apparatus for drying coarse and fine particles wherein all particles are discharged at about the same temperature, or more desirably, the coarse particles are a little hotter than the fine particles.

A still further object is to provide an improved lifting flight structure for use in a single-shell, rotary dryer for aggregate used in preparing bituminous road paving compositions.

Other objects and advantages of the invention will become apparent from the following description and accompanying drawings in which:

Fig. 1 is a perspective, cut-away view of the rotary dryer of the invention;

Fig. 2 is a side elevation of a rotary dryer embodying the invention;

Fig. 3 is a view, partially in section, taken along line 3—3 of Fig. 2, looking in the direction of the arrows;

Fig. 4 is a partial section taken along line 4—4 of Fig. 2, looking in the direction of the arrows;

Fig. 5 is an end view of the flight structure of the invention; and

Fig. 6, Fig. 7 and Fig. 8 are end views of other embodiments of the flight structure of the invention.

As shown in Figs. 1 and 2, a single shell, rotary kiln, comprising a cylindrical or tubular kiln shell 1, is rotatably carried on a plurality of rollers 3, each of which cooperatively engages one of riding rings 5 in any well-known manner for rotating the shell about the shell axis. The longitudinal axis of the shell is slightly inclined downwardly from the feed end to the discharge end in the customary manner, as shown in Fig. 2, the inclination of the axis of the shell usually being of the order of about one-half inch to one inch per foot. Usually the axis inclination is about five-eighth inch to three-quarter inch per foot, but the axis inclination can be from seven-eighth inch to one inch per foot when the flight structure of the invention is embodied in the shell leading to increased production rate because of the steeper inclination of the shell axis. The shell 1 is provided with means for introducing material therein at the feed end, such as conveyer belt 7, and means for withdrawing material therefrom at the discharge end, such as gravity drop 9. The discharge end of the shell is also provided with a combustion chamber 11 in which are produced heated gases, such as are produced by burning fuel oil, which flow through the shell and are removed through an exhaust stack 13 connected to an exhaust blower, not shown, thereby heating and evaporating liquid from wet material introduced to the shell at the feed end.

The shells of rotary kilns of the type under consideration are customarily equipped with material lifting flights which are attached with about equal spacing to, along and about the inner periphery of the shell and arranged so that, when the shell is rotated, the wet material is lifted and dropped in a shower or curtain through the hot combustion gases in order to expose the maximum heat transfer surface of each particle of wet material to the hot gases flowing through the shell. Three sets of such conventional lifting flights 15 are shown in Fig. 2 and the partial section view taken along line 4—4 of Fig. 2 is shown in Fig. 4 which illustrates the conventional lifting flights 15. As shown in Fig. 2, the lifting flights 15 are so disposed about the inner surface of shell 1 so that each set of flights 15 is displaced circumferentially from the set adjacent thereto so as to produce a constantly falling curtain of material in shell 1 as the shell is rotated in a counterclockwise direction.

All of the foregoing description has related to conventional rotary kiln apparatus. Many modifications of such apparatus are known and need not be illustrated, such as the installation of helical-shaped flights at the feed end in order to facilitate movement of wet material into and down the rotating shell. The prior patents cited hereinabove illustrate other modifications in rotary kilns that are known.

The essence of this invention lies in the new lifting flight structure shown in Figs. 1, 3 and 5, as well as Fig. 2, and modifications of which are shown in Figs. 6, 7 and 8. Referring particularly to Figs. 1, 3 and 5, it will be observed that each of the new lifting flights comprises a generally rectangular lifting plate 17, a generally rectangular cover plate 19 and a series of approximately rectangular deflector plates 21. The lifting plate 17 extends longitudinally along the inner surface of the shell 1 in the same direction as the longitudinal axis of shell 1 and the plane of lifting plate 17 extends inwardly from shell 1 in the conventional manner of lifting flights in rotary dryers of this type. Thus, the lifting plate 17 extends inwardly from the inner surface of shell 1 so as to form an angle with a tangent touching the shell at the position of the lifting plate. The angle formed by lifting plate 17 and the shell tangent shown in Figs. 1, 3 and 5 is about 60°, but this can be varied, especially when other modifications of the flight structure are employed. For example, the plane of the lifting plate in the flight structure shown in Fig. 6, to be discussed later, forms a 90° angle with a tangent to shell 1 at the position of the lifting plate. Stated in another way, there is a 90 degree angle formed by the planes of the lifting plate and the cover plate in Fig. 6.

Lifting plate 17 is held in the position described by a rigid attachment, such as a riveted bracket, not shown, or by welds 23, shown in Fig. 5, to an edge of cover plate 19. Cover plate 19 is generally aligned in the same direction as the longitudinal axis of shell 1 and is positioned within shell 1 generally so that its flat lower surface is parallel to a tangent to shell 1 at a point opposite the middle of cover plate 19 on shell 1. Thus, the plane of cover plate 19 is at an angle with the plane of lifting plate 17 which is, as stated above, usually about 60 degrees. Here again, variation can occur, such as in employing other than a flat plate for cover plate 19, such as a curved plate.

To complete the description of how the new flight structure is arranged, generally, it will be observed from Figs. 1, 3 and 5 that cover plate 19 is supported in the position described by a rigid attachment, such as welds 20, to the top edges of a series of deflector plates 21 and deflector plates 21 are welded at their lower edges directly to the inner surface of shell 1 by welds 22. Obviously, riveted brackets can be employed instead of welds 20, 22 and 23. Thus, lifting plate 17 is held in position by and supported by cover plate 19 and cover plate 19 is held in position by and supported by the plurality of deflector plates 21.

Two features of structure in the new lifting flights are of extreme importance. One is the presence of a series of perforations or holes 25 in lifting plate 17 and the other is the position on the flat, inner fact of lifting plate 17 at which cover plate 19 is rigidly attached. Thus, the cover plate 19 must be attached to lifting plate 17 along a line which is above perforations 25 as clearly shown in Figs. 1 and 5. This means simply that cover plate 19 must be attached to lifting plate 17 at a place spaced from holes 25 and that deflector plates 21 must be attached to that face of cover plate 19 which is adjacent to holes 25 in lifting plate 17.

Perforations 25 are disposed in a row longitudinally along lifting plate 17. The row of perforations or holes 25 can be located at any position on lifting plate 17 as long as cover plate 19 is attached to lifting plate 17 at a place which is spaced from perforations 25 and so long as deflector plates 21 are attached to that face of cover plate 19 which is adjacent to holes 25. Thus, the row of perforations or holes is shown along the top portion of a curved lifting plate in Fig. 8 with the cover plate attached to the top edge of the lifting plate and the deflector plates attached to that face of the cover plate which is adjacent to the perforations.

Perforations or holes 25 can be of any shape although circular perforations may be the most economical to fabricate. Perforations 25 can vary in size depending on the type of aggregate to be dried as will become apparent from a discussion of the operation of the new flight structure to follow. Generally, perforations 25 are circular holes ranging from one-quarter to one-half inch in diameter with three-eighth inch diameter circular holes being preferred. Perforations 25 can be other shapes, however, such as slots, squares and the like. The perforations 25 in the flight structure according to the invention which has been used successfully were formed very simply by punching holes in the lifting plate with a steel punch. The number of perforations 25 is usually about that number such that the total area of holes 25 is equal to about one-half the area of lifting plate 17 occupied by the row of holes but their position, size and spacing all are determined by the proportion of sand and stone in the aggregate to be handled. Perforations 25 must be small enough so that the stone in the aggregate will not pass through perforations 25 and large enough to admit the sand in the aggregate. Usually, the row of perforations 25 occupies the lower third of lifting plate 17, as shown in Figs. 1, 3 and 5. However, the row of holes can occupy a greater portion of the lifting plate and, indeed, the entire lifting plate can be covered by the holes. In this case, the cover plate is attached to the top edge of the lifting plate 17.

In order to facilitate admission of the sand in the aggregate through lifting plate 17, which is the function of perforations 25, lifting plate 17 is held by cover plate 19 in a position spaced from the inner surface of shell 1 so that a space 27, shown most clearly in Fig. 5, generally equal in width to the diameter of perforations 25, extends the length of lighting plate 17 between the lower edge of lifting plate 17 and the inner surface of shell 1.

The finer material in the mixture to be dried, such as the sand in paving aggregate, passes through perforations 25 in lifting plate 17 and space 27 and is met by the deflector plates 21 underneath cover plate 19. Deflector plates 21 usually have curved lower edges to fit the inner surface of shell 1, to which deflector plates 21 are attached, such as by welds 22, and a flat upper edge to fit against the lower surface of cover plate 19, to which deflector plates 21 are attached, such as by welds 20. Deflector plates 21 are positioned angularly across that face of cover plate 19 which is adjacent to holes 25 and at an angle to the longitudinal axis of shell 1, the angle being about 45° in the flight structure shown in Fig. 1. The angular position of deflector plates 21 serves to urge the sand in the aggregate forward through the shell at a faster rate than the rate of the forward motion of the sand due to the inclination of shell 1. The angle formed by deflector plates 21 and the longitudinal axis of shell 1 should not be greater than 90° and should not be less than the angle of natural repose for the fine material admitted to deflector plates 21 through perforations 25 and space 27. Thus, where a faster rate of motion for the sand is desired, the angle formed by deflector plates 21 and the longitudinal axis of shell 1 should be relatively smaller, such as 45° or less. Where a slower rate of motion for the sand is desired, the deflector plate angle should be greater than 45° but less than 90°.

Deflector plates 21 are usually arranged parallel to and equally spaced from each other as shown in Fig. 1. Also, in the dryers that have been used, the deflector plates are arranged so that the trailing end of one deflector plate is opposite the leading end of the following deflector plate. Variation in structure here can be employed to suit the type of sand-stone mixture to be handled. Thus, the deflector plates can be arranged so as to overlap each other to a greater or lesser extent or they can be arranged so that the trailing end of one deflector plate is spaced ahead of the leading end of the next deflector plate. Similarly, the number of deflector plates positioned beneath cover plate 19 in a unit flight structure can be determined so as to suit the aggregate composition to be handled. In the dryers in use, there are five deflector plates equally spaced beneath cover plate 19 and along lifting plate 17 as shown in Fig. 1.

Before continuing with a description of the placement of the flights in a dryer, the manner in which the flight structure of the invention operates so as to accomplish the objectives of the invention will be described. Referring to Figs. 1 and 3, it will be noted that a plurality of the new flight structures are positioned around the inner surface of shell 1. Shell 1 is rotated in a counterclockwise direction in the customary manner and contains wet aggregate to be dried. Particularly, the objective is to remove the water contained in the stone while not overheating the sand. Thus, the objective is to achieve a stone temperature which is at least as high as the sand temperature in the aggregate discharged from the dryer which indicates that the internal water in the stone has been removed. Desirably, the stone temperature should be about 5° F. to 35° F. higher than the sand temperature. Thus, when shell 1 is rotated in a counterclockwise direction, the aggregate is picked up and raised by lifting plate 17. As the rotation of shell 1 continues, lifting plate 17 approaches a horizontal position carrying the mixture of sand and stone thereupon. However, as the rotation of shell 1 continues, the sand in the aggregate passes through perforations 25 and space 27 and is thereby separated from the stone which is too large to pass through these openings. The sand which passes through perforations 25 and space 27 is met by deflector plates 21 beneath cover plate 19 and, due to the angular position of deflector plates 21, the sand is urged forward through shell 1 at a rate faster than the rate the sand would move through shell 1 due to the inclination of shell 1. The stone in the aggregate is lifted on up by the lifting plate 17 until the rotation of shell 1 results in lifting plate 17 passing beyond horizontal at which point the stone is dumped in a curtain down across the middle of shell 1. However, the dumped stone does not immediately mix with sand being moved forward by deflector plates 21 because the stone falls on cover plate 19. The stone moves forward through shell 1 at the rate determined solely by the inclination of shell 1 while the sand moves at a faster rate due to the action of angularly placed deflector plates 21 beneath cover plate 19. The result is that the longer residence time of the stone results in thorough drying of the stone while not overheating the sand.

The foregoing discussion of the operation of the lifting flight structure of the invention assumes, and the drawings show, that a plurality of the flight structures are positioned about the inner surface of shell 1. Single-shell rotary dryers for aggregate usually range from 5 to 10 feet in diameter and from 25 to 40 feet in length. The dryers which have been built, tested and used employing the flight structure of the invention are 6 to 8 feet in diameter and 30 to 33 feet in length. In these dryers, lifting plate 17 is 12 inches wide and about 5 feet long, the lower 4 inches of which are occupied by a row of three-eighth inch holes. Deflector plates 21 were made from 4 inch strap iron shaped to fit the curvature of shell 1 along their lower edges. The top straight edge of deflector plates 21 was welded to the lower surface of cover plate 19. Deflector plates 21 were set at a 45° angle with the longitudinal axis of shell 1.

In these dryers that are in use, shell 1 is divided into five equal sections with the new flight structure of the invention installed in the two sections adjacent to the discharge end of shell 1 and conventional flights 15 installed in the three sections adjacent to the feed end of shell 1. From 6 to 9 lifting flights according to the invention are installed equally spaced from each other about the inner periphery of the two sections of shell 1 adjacent to the shell discharge and from 10 to 13 conventional flights 15 are installed equally spaced from each other about the inner periphery of the three sections of shell 1 adjacent to the feed end of the shell. As shown in Fig. 3, the flights of the invention are installed in the two sections so as to be displaced circumferentially about the inner surface of shell 1, one section of flights from the other section of flights, so as to produce a uniform curtain of falling stone and efficient heat transfer to both sand and stone.

Reference has been made to modifications of the flight structure of the invention that can be made, some of which are illustrated in Figs. 6, 7 and 8. Thus, in Fig. 6, lifting plate 17a is channel-shaped in which the long side extends inwardly from the inner surface of shell 1 at a 90° angle with a tangent to shell 1 at the position of the channel lifting plate. The flight structure shown in Fig. 6 is otherwise the same as that shown in Figs. 1, 3 and 5. In Fig. 7, lifting plate 17b is curved so that its concave surface carries the aggregate as shell 1 is rotated and cover plate 19b is attached to the convex surface of lifting plate 17b. It will be noted that perforations 25a and 25b in Figs. 6 and 7, respectively, are in the lower third of lifting plates 17a and 17b, respectively, and that in both cases the cover plate is attached to the lifting plate at a point above the perforations. In Fig. 8, lifting plate 17c is curved as in Fig. 7 but the row of perforations 25c is positioned along the top third of lifting plate 17c. Here, again, cover plate 19c is attached to lifting plate 17c at a place above perforations 25c which, in this case, means that cover plate 19c is attached to the top edge of curved lifting plate 17c. Other arrangements of perforations, shapes of lifting plates and place of attachment of the cover plate to lifting plate can be devised by those skilled in the art so long as adherence is given to the requirement that the cover plate be attached to the lifting plate at a place above the perforations, or, in other words, so long as the position of attachment of the cover plate to the lifting plate is spaced from the row of holes and the deflector plates are attached to that face of the cover plate which is adjacent to the row of holes in the lifting plate.

Thus, this invention is believed to provide for the first time a single-shell rotary dryer structure in which the temperature of the discharged stone equals or is higher than the temperature of the discharged sand. There are other advantages for the flight structure of the invention that have not been mentioned. One is that the problem of insuring that the hot combustion gases reach the relatively cold feed end of the shell is largely overcome. The flight structure of the invention removes most of the sand from the curtain of aggregate in the portion of the shell where the new flights are installed and this permits the hot gases to reach back to the feed end. Thus, the problem of condensation of water vapor in the feed end is overcome. This improvement is manifested by an increase in the temperature of the gases in the exhaust stack when the new flight structures were installed. In conventional dryers the stack temperature is about 250° F. After installation of the new flight structures as described hereinabove, the stack temperature ranged from 380–410° F.

Another advantage is that, although the new flight structures effect a separation of the sand and stone, the separation is only during the time when the curtain of aggregate falls through the kiln shell. Thereafter, deflector plates 21 urge the sand forward and, due to the rotation of the shell, inwardly as well. Thus, the falling stone mixes again with the hot sand which provides a soaking period which aids in heating the stone to remove the internal water. The new flight structure provides a sequence of separation and recombination steps for the sand and stone as the shell is rotated. This soaking period is a strong advantage for a single-shell dryer employing the new flight structure over double-shell dryers where a separation of sand and gravel is made, but once effected, cannot be changed until the drying operation is finished.

Actually, the foregoing data on temperatures of sand, stone and exhaust stack in dryers employing the new flight structure are based on experience with single-shell dryers in which about 37 percent of the shell length is occupied by the new flight structure. Greater increases in stone temperature can be achieved by installing the new flight structure in a greater portion of the shell, such as 50–75 percent, of the shell length, or by installing the new flights throughout the length of the shell.

Perhaps the most striking advantage for dryers employing the new flight structure is the tremendous saving in fuel cost due to the increased production of more efficiently dried aggregate that is achieved. Such a saving amounting to up to one-third of the fuel cost incurred when using conventional single-shell dryers has been achieved.

I claim:

1. A lifting flight for suspension from the interior of material showering drums, which comprises, a lifting plate having a long dimension and a short dimension and having perforations positioned along the long dimension of said lifting plate, a cover plate rigidly attached to said lifting plate along the long dimension of said lifting plate and at a place spaced from said row of perforations, the plane of the cover plate extending outwardly from the plane of the lifting plate, and a plurality of deflector plates rigidly attached to that face of said cover plate which is adjacent to the row of perforations in said lifting plate, said deflector plates being attached at their edges in spaced relationship to each other to said cover plate and the planes of said deflector plates extending outwardly from the plane of said cover plate, the longitudinal axis of each of said deflector plates forming an acute angle with the longitudinal axis of said cover plate.

2. A lifting flight for attachment to the inner surface of a single-shell rotary dryer, which comprises, a lifting plate having a long dimension and a short dimension, a cover plate having a long dimension and a short dimension, and a plurality of about equally sized deflector plates each of which has a long dimension and a short dimension, said lifting plate having a plurality of generally equal diameter holes disposed in a generally straight row along the long dimension of said lifting plate, said cover plate being about the same length as said lifting plate and said cover plate being rigidly attached along a long dimensional edge thereof to said lifting plate along a place which is spaced from said row of holes in said lifting plate, the cover plate being attached to said lifting plate in a position so that the plane of said cover plate extends outwardly from the plane of said lifting plate, said deflector plates being rigidly attached along the long dimension edges thereof angularly across that face of said cover plate which is adjacent to the row of holes in said lifting plate, said deflector plates extending outwardly from said cover plate face and said deflector plates being about equally spaced from each other, and the longitudinal axis of each of said deflector plates forming an acute angle with the longitudinal axis of said cover plate.

3. A lifting flight for attachment to the inner surface of a single-shell rotary dryer for drying aggregate containing sand and stones, which comprises, a lifting plate having a long dimension and a short dimension, a cover plate having a long dimension about equal to said lifting plate long dimension and having a short dimension, and a plurality of about equally sized deflector plates each of which has a long dimension and a short dimension, said lifting plate having a row of holes disposed along its long dimension adjacent an edge of said lifting plate, said row of holes being about as wide as one-third the width of said lifting plate, the diameter of said holes being less than the diameter of the stones in said aggregate but great enough to admit the sand in said aggregate, said cover plate being rigidly attached along a long dimensional edge thereof to said lifting plate along a line which is spaced from said row of holes, the cover plate being attached to said lifting plate in a position so that the short dimensional axis of the cover plate extends outwardly from the long dimensional axis of the lifting plate, each of said deflector plates being rigidly attached along its long dimensional edge angularly across that face of said cover plate which is adjacent to the row of holes in said lifting plate, the longitudinal axis of each of said deflector plates forming an acute angle with the longitudinal axis of said cover plate, the plane of each of said deflector plates being about perpendicular to the plane of said cover plate, said deflector plates being about parallel to one another and being about equally spaced one from another.

4. A lifting flight for attachment to the inner surface of a rotatable single-shell dryer for drying aggregate containing sand and stones, which comprises, a generally rectangular lifting plate, a generally rectangular cover plate of about the same length as said lifting plate, and a plurality of approximately rectangular and equally sized deflector plates, said lifting plate having a straight row of about equal diameter holes disposed along the long dimension of the lifting plate, said row of holes being as wide as about one-third the width of said lifting plate, the diameter of the holes being sufficiently large to admit all of said aggregate therethrough except the stones in said aggregate, the number of holes in said row being such that the total area of the holes is about half the area of that portion of the lifting plate in which said row of holes is disposed, said cover plate being rigidly attached along a long dimensional edge thereof to said lifting plate along a line which is spaced from but adjacent to said row of holes, the plane of said cover plate extending outwardly from the plane of said lifting plate, each of said deflector plates being rigidly attached at their long dimensional edges angularly across that face of said cover plate which is adjacent to the row of holes in said lifting plate, the longitudinal axis of each of said deflector plates forming an acute angle with the longitudinal axis of said cover plate, the planes of each of said deflector plates being about parallel to one another and being about perpendicular to the plane of said cover plate, said deflector plates being about equally spaced from each other, the length and angular position of attachment of said deflector plates to said cover plate being so arranged that the trailing end of one deflector plate is about opposite to the leading end of the next adjacent deflector plate.

5. A lifting flight according to claim 4 wherein said row of holes is disposed along one side of and next to an edge of said lifting plate.

6. A lifting flight according to claim 4 wherein the plane of said cover plate forms about a 60 degree angle with the plane of said lifting plate.

7. A lifting flight according to claim 4 wherein said lifting plate is channel-shaped.

8. A lifting flight according to claim 4 wherein said lifting plate is curved across its short dimension, the cover plate being attached to the convex surface of said curved lifting plate.

9. In apparatus for drying various aggregates used in the paving industry and the like, a rotatable tubular shell through which the hot drying gases pass in countercurrent flow to the particulate aggregate material, said shell being mounted for rotation about its longitudinal axis and having an inlet for aggregate material at one end and an outlet at the other end, a series of material lifting flights carried by and peripherally spaced around the inner surface of said shell adjacent to the material outlet end of said shell, each of said lifting flights comprising a lifting plate having a long dimension and a short dimension, a cover plate having a long dimension and a short dimension, and a plurality of about equally sized deflector plates each of which has a long dimension and a short dimension, said lifting plate having a plurality of generally equal diameter holes disposed in a generally straight row along the long dimension of said lifting plate, said row of holes occupying about one-third of the short dimension of said lifting plate, said cover plate being about the same length as said lifting plate and said cover plate being rigidly attached along a long dimensional edge thereof to said lifting plate along a place which is spaced from said row of holes in said lifting plate, the cover plate being attached to said lifting plate in a position so that the plane of said cover plate extends outwardly from the plane of said lifting plate, said deflector plates being rigidly attached along one of the long dimensional edges thereof angularly across that face of said cover plate which is adjacent to the row of holes in said lifting plate and being rigidly attached along the other of the long dimensional edges thereof to the inner surface of said tubular shell, the plane of said cover plate being about parallel to a tangent to said shell touching said shell oppohite the midpoint of said cover plate, the longitudinal axis of each of said deflector plates forming an acute angle with the longitudinal axis of said cover plate, the planes of said deflector plates being about perpendicular to the plane of said cover plate, the cover plate thus being carried by said deflector plates and the lifting plate being carried by said cover plate, and that edge of said lifting plate adjacent to the inner surface of said shell being spaced from said inner surface of said shell.

10. In apparatus for drying various aggregates used in the paving industry and the like, a rotatable tubular shell through which the hot drying gases pass in countercurrent flow to the particulate aggregate material, said shell being mounted for rotation about its longitudinal axis and having an inlet for aggregate material at one end and an outlet at the other end, a series of material lifting flights carried by and peripherally spaced around the inner surface of said shell adjacent to the material outlet end of said shell, each of said lifting flights comprising a lifting plate having a long dimension and a short dimension, a cover plate having a long dimension about equal to said lifting plate long dimension and having a short dimension, and a plurality of about equally sized deflector plates each of which has a long dimension and a short dimension, said lifting plate having a row of holes disposed along its long dimension adjacent an edge of said lifting plate, said row of holes being about as wide as one-third the width of said lifting plate, the diameter of said holes being less than the diameter of the stones in said aggregate but great enough to admit the sand in said aggregate, said cover plate being rigidly attached along a long dimensional edge thereof to said lifting plate along a line which is spaced from said row of holes, the cover plate being attached to said lifting plate in a position so that the short dimensional axis of the cover plate extends outwardly from the long dimensional axis of the lifting plate, each of said deflector plates being rigidly attached along one of its long dimensional edges angularly across that face of said cover plate which is adjacent to the row of holes in said lifting plate and each of said deflector plates being rigidly attached along the other of its long dimensional edges to the inner surface of said tubular shell, the plane of said cover plate being about parallel to a tangent to said shell touching said shell opposite the midpoint of said cover plate, the longitudinal axis of each of said deflector plates forming an acute angle with the longitudinal axis of said cover plate, the planes of said deflector plates being about perpendicular to the plane of said cover plate, the cover plate thus being carried by said deflector plates and the lifting plate thus being carried by said cover plate, the line along said lifting plate at which said cover plate is rigidly attached being so chosen that that edge of said lifting plate adjacent to the inner surface of said shell is spaced from said shell surface by a distance about equal to the diameter of the holes in said lifting plate.

11. An apparatus according to claim 10 wherein the plane of said lifting plate forms about a 60 degree angle with the plane of said cover plate and wherein the plurality of parallel deflector plates are positioned at an angle with the axis of said rotatable shell which is in the range of at least equal to the natural angle of repose of said aggregate material and up to a 90 degree angle with the axis of said rotatable shell.

12. An apparatus according to claim 10 wherein the plurality of parallel deflector plates are positioned at about a 45 degree angle with the axis of said rotatable shell.

13. An apparatus according to claim 12 wherein the deflector plates are so positioned that the trailing end of each deflector plate is opposite to the leading end of the next adjacent deflector plate.

14. An apparatus according to claim 13 wherein two series of said material lifting flights are carried by and peripherally spaced around the inner surface of said rotatable shell, the first of said series of lifting flights being mounted in said shell adjacent to the outlet end of said shell and the second of said series of lifting flights being mounted in said shell adjacent to the first of said lifting flights, each of the lifting flights in each of said series being about equally spaced about the inner periphery of said shell, the lifting flights in said second series being circumferentially displaced about said shell with respect to the position of the lifting flights in said first series of lifting flights.

15. An apparatus according to claim 14 wherein a plurality of series of said material lifting flights are installed as defined in claim 14 in said rotatable shell, the number of series of said flights and the size of said flights being so arranged that the lifting flights occupy from about 50–75 percent of the length of said shell.

16. An apparatus according to claim 15 wherein the number of series of said flights and the size of said flights is so arranged that the lifting flights occupy the entire length of said shell.

References Cited in the file of this patent

UNITED STATES PATENTS

| | | |
|---|---|---|
| 1,121,429 | Weinrich | Dec. 15, 1914 |
| 1,135,796 | Hiller | Apr. 13, 1916 |
| 2,317,532 | James | Apr. 27, 1943 |

FOREIGN PATENTS

| | | |
|---|---|---|
| 722,300 | France | Mar. 15, 1937 |